(12) United States Patent
Schoeneman et al.

(10) Patent No.: US 10,875,381 B2
(45) Date of Patent: Dec. 29, 2020

(54) THERMAL MANAGEMENT SYSTEM IN A VEHICLE AND METHOD FOR OPERATION OF THE SYSTEM

(71) Applicant: Ford Global Technologies, LLC, Dearborn, MI (US)

(72) Inventors: Christian Schoeneman, Southgate, MI (US); Peter Rowling, Cambridge (GB); Sixin Fan, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 64 days.

(21) Appl. No.: 16/248,658

(22) Filed: Jan. 15, 2019

(65) Prior Publication Data

US 2020/0223280 A1 Jul. 16, 2020

(51) Int. Cl.
*B60H 1/00* (2006.01)

(52) U.S. Cl.
CPC ..... *B60H 1/00278* (2013.01); *B60H 1/00328* (2013.01); *B60H 1/00392* (2013.01)

(58) Field of Classification Search
CPC ............ B60H 1/00278; B60H 1/00328; B60H 1/00392

USPC ......................................................... 165/202
See application file for complete search history.

(56) References Cited

U.S. PATENT DOCUMENTS

| | | | |
|---|---|---|---|
| 8,336,319 B2 | 12/2012 | Johnston et al. | |
| 8,753,762 B2 | 6/2014 | Major et al. | |
| 9,905,638 B1 | 2/2018 | Tominari et al. | |
| 2014/0070013 A1 | 3/2014 | Stanek et al. | |
| 2014/0216709 A1 | 8/2014 | Smith et al. | |
| 2017/0197488 A1* | 7/2017 | Kim | B60H 1/00278 |

* cited by examiner

*Primary Examiner* — Davis D Hwu
(74) *Attorney, Agent, or Firm* — David Kelley; McCoy Russell LLP

(57) ABSTRACT

Thermal management systems and methods for operation thereof are provided for allocating coolant flow in a vehicle. The thermal management system includes a cabin heat exchanger in fluidic communication with a heater and an energy storage device heat exchanger in fluidic communication with the heater. The thermal management system is designed to, in a first mode, flow heated coolant from the heater to the cabin heat exchanger in a first coolant loop and flow cooled coolant to the energy storage device heat exchanger from an energy storage device cooler in a second coolant loop temporarily separated from the first coolant loop and, in a second mode, flow heated coolant from the heater to the cabin heat exchanger and then to the energy storage device heat exchanger in series.

20 Claims, 6 Drawing Sheets

THERMAL MANAGEMENT SYSTEM IN A VEHICLE AND METHOD FOR OPERATION OF THE SYSTEM

FIELD

The present description relates generally to a thermal management system for a vehicle and a method for operation of a thermal management system.

BACKGROUND/SUMMARY

Previous vehicles have utilized separate heaters to temperature adjust various vehicle systems such as a traction battery powering an electric motor, cabin heaters, etc. Specifically, battery electric vehicles (BEVs) have been designed with one dedicated heater for heating a traction battery and another heater solely providing heat to a heater core. Providing dedicated heaters for battery and cabin heating is costly and increases the failure modes of the vehicle system. As a result, the likelihood of heating system degradation along with the cost of heating system repair is increased.

Attempts have been made to design heating systems routing heated coolant from a heater to multiple vehicle systems. One example approach is shown by Porras et al. in U.S. Pat. No. 9,950,638 B2. The system in Porras uses a heater and heat pump to generate heat and provide said heat to a heater core and a traction battery during different operating conditions. However, the inventors herein have recognized potential issues with such systems. As one example, Porras' system cannot provide cooling to the battery while the cabin is being heated. As such, the desired cooling and heating set-points of the cabin and battery may not be achieved during certain operating conditions. Moreover, Porras' system includes a highly complex coolant circuit directing coolant through various loops traveling to a heater, heat pump, cabin heat exchanger, battery heat exchanger, battery chiller, etc. The complex system design increases the chance of system failure, and also increases system servicing and repair costs. This in turn increases vehicle manufacturing and operating costs.

In one example, the issues described above may be addressed by a thermal management system in a vehicle, comprising a cabin heat exchanger in fluidic communication with a heater and an energy storage device heat exchanger in fluidic communication with the heater. The thermal management system further includes a controller with computer readable instructions stored in non-transitory memory that when executed, cause the controller to, in a first mode, flow heated coolant from the heater to the cabin heat exchanger in a first coolant loop and flow cooled coolant to the energy storage device heat exchanger from an energy storage device cooler in a second coolant loop temporarily separated from the first coolant loop. The system also includes computer readable instructions that when executed cause the controller to, in a second mode, flow heated coolant from the heater to the cabin heat exchanger and then to the energy storage device heat exchanger in series. In this way, a streamline system functioning to heat the cabin and the energy storage device as well as cool the battery while the cabin is being heated is achieved. As a result, the system's efficiency is increased while meeting heating and cooling needs of the vehicle cabin and energy storage device.

In one example, the heater is the only heater in the thermal management system. In this way, a single heater is provided in the system, allowing for efficient heating of both the cabin heat exchanger and the energy storage device.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a thermal management system in a vehicle (e.g., battery electric vehicle (BEV)) and methods for the efficient coolant routing in the system. The thermal management system includes a heater providing heated coolant first to a cabin heat exchanger and then an energy storage device, during one operating mode. In this way, both the vehicle cabin and the energy storage device can be efficiently heated in series via a common heater. In one example, the heated coolant may be routed to the energy storage device from the cabin heat exchanger without traveling through any intervening heat exchangers. Consequently, the system's efficiency can be increased. The thermal management system, in another operating mode, flows heated coolant from the heater to the cabin heat exchanger in a first coolant loop and flows cooled coolant from an energy storage device cooler to the battery in a second coolant loop. During this mode the first and second coolant loops are temporarily fluidly separated. In this way, the system can be reconfigured to flow coolant in parallel coolant loops to allow different heating and cooling setpoints for the battery and vehicle cabin to be achieved. In one example, during the second mode coolant flow through the energy storage device cooler is inhibited. In this way, flowing heated coolant through the cooler can be avoided to prevent cooler degradation. Further in one example, the heater may be the sole heater providing heated coolant to the cabin heat exchanger and the energy storage device. Consequently, the system's efficiency is increased and manufacturing costs are reduced.

Figure 1:
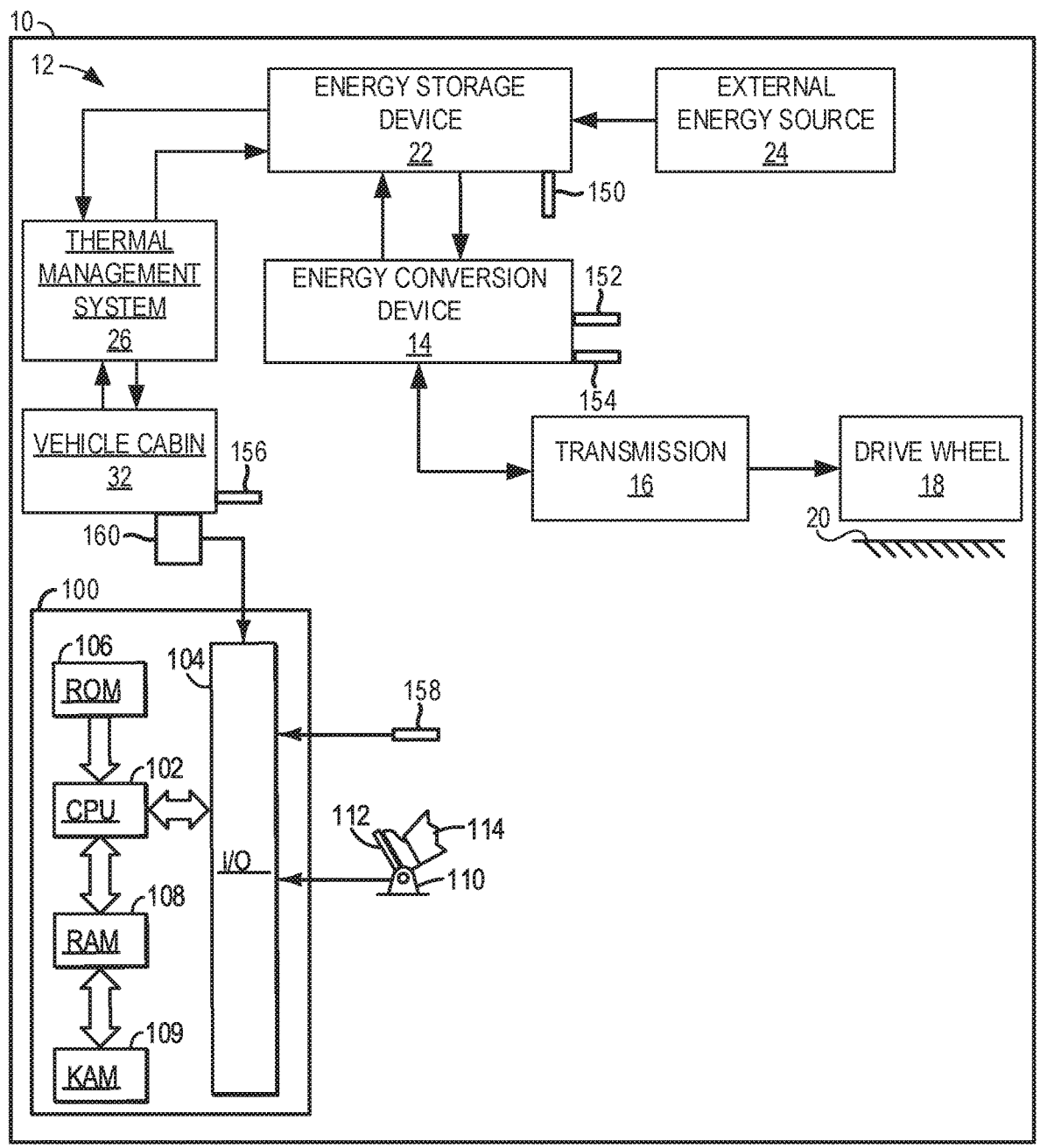
FIG. 1 shows a schematic depiction of a vehicle including a thermal management system.
Figure 6:
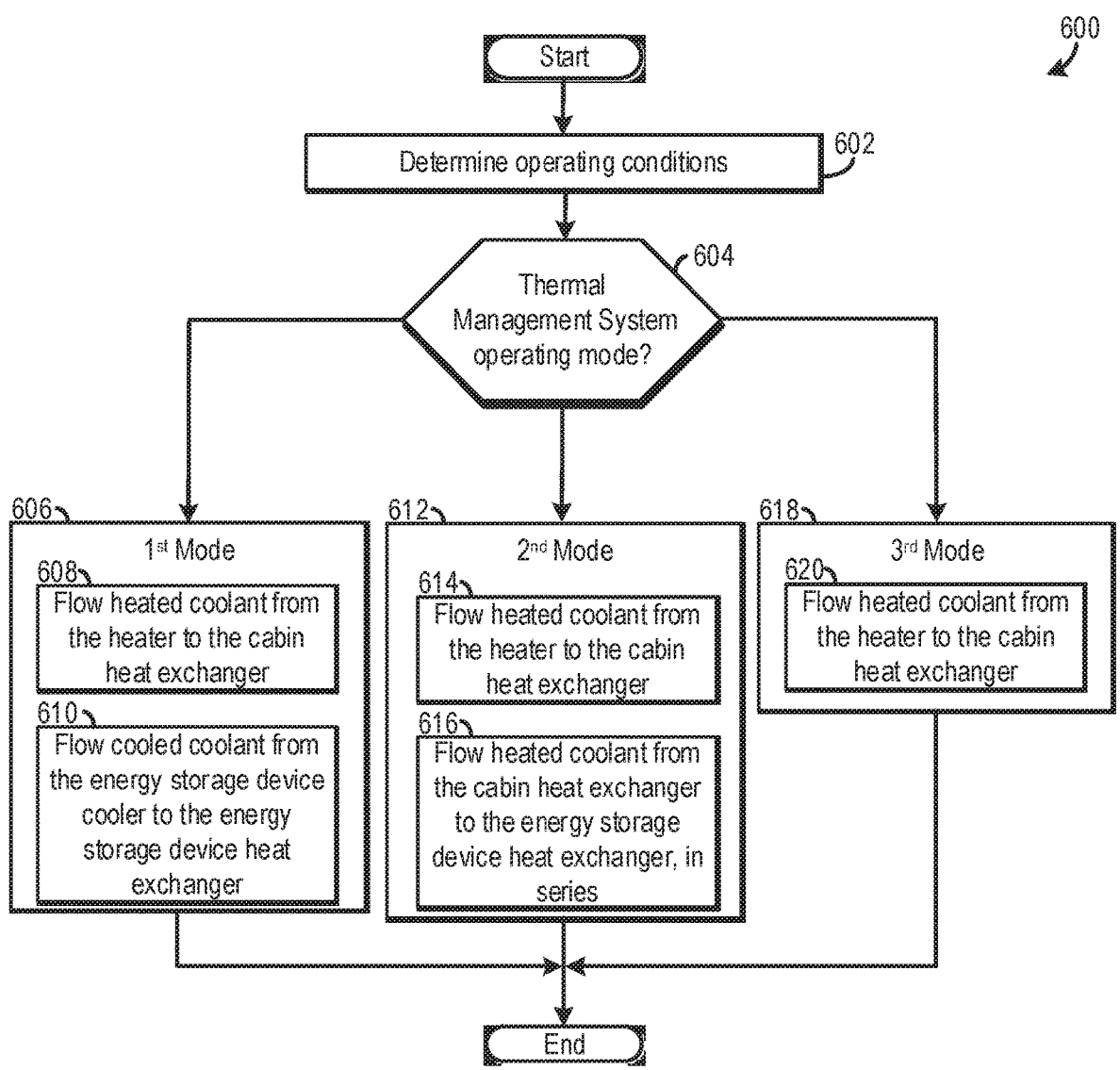
FIG. 6 shows a method for operating a thermal management system.
Figure 7:
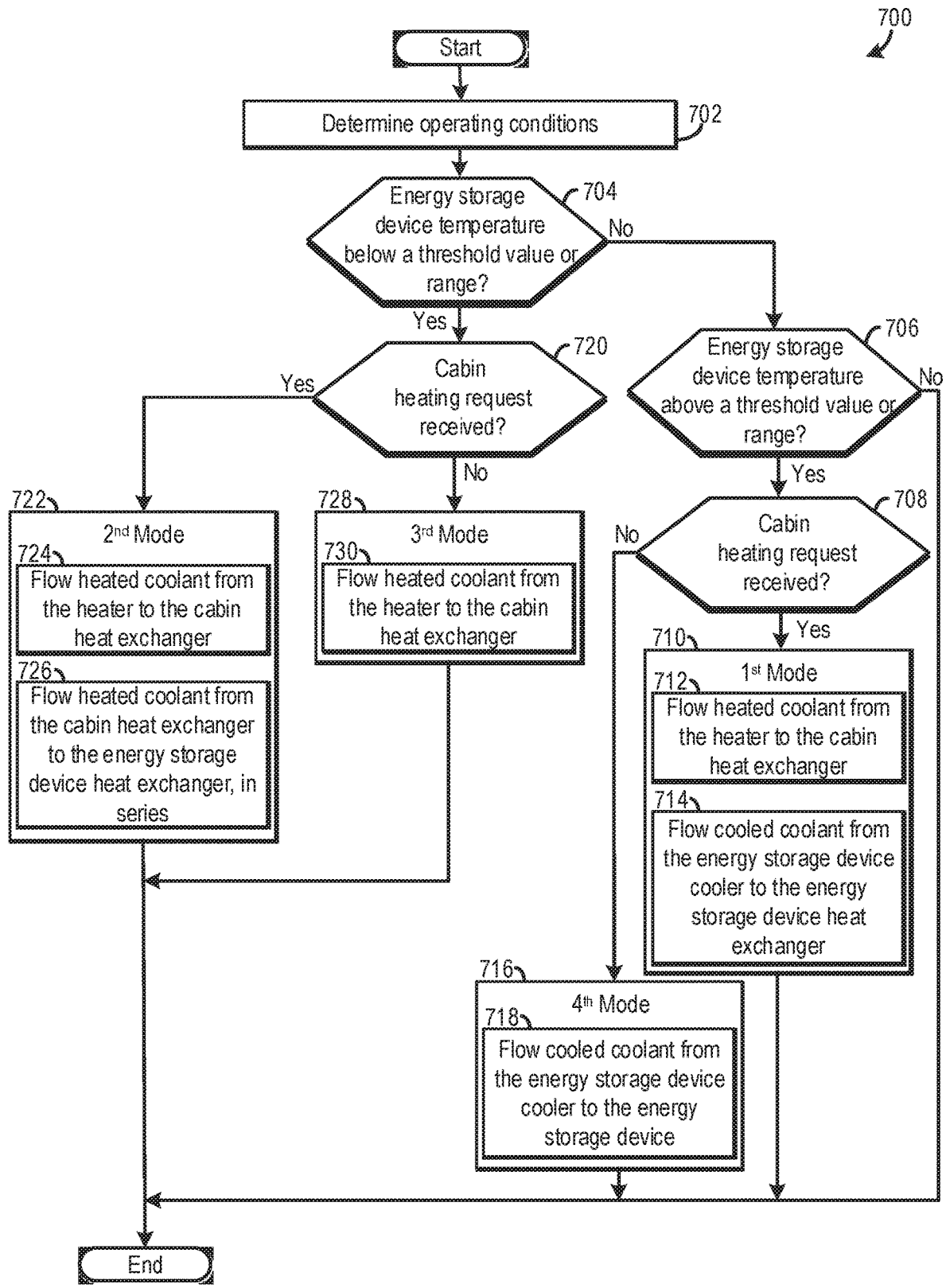
FIG. 7 shows a detailed method for operating a thermal management system.
Figure 8:
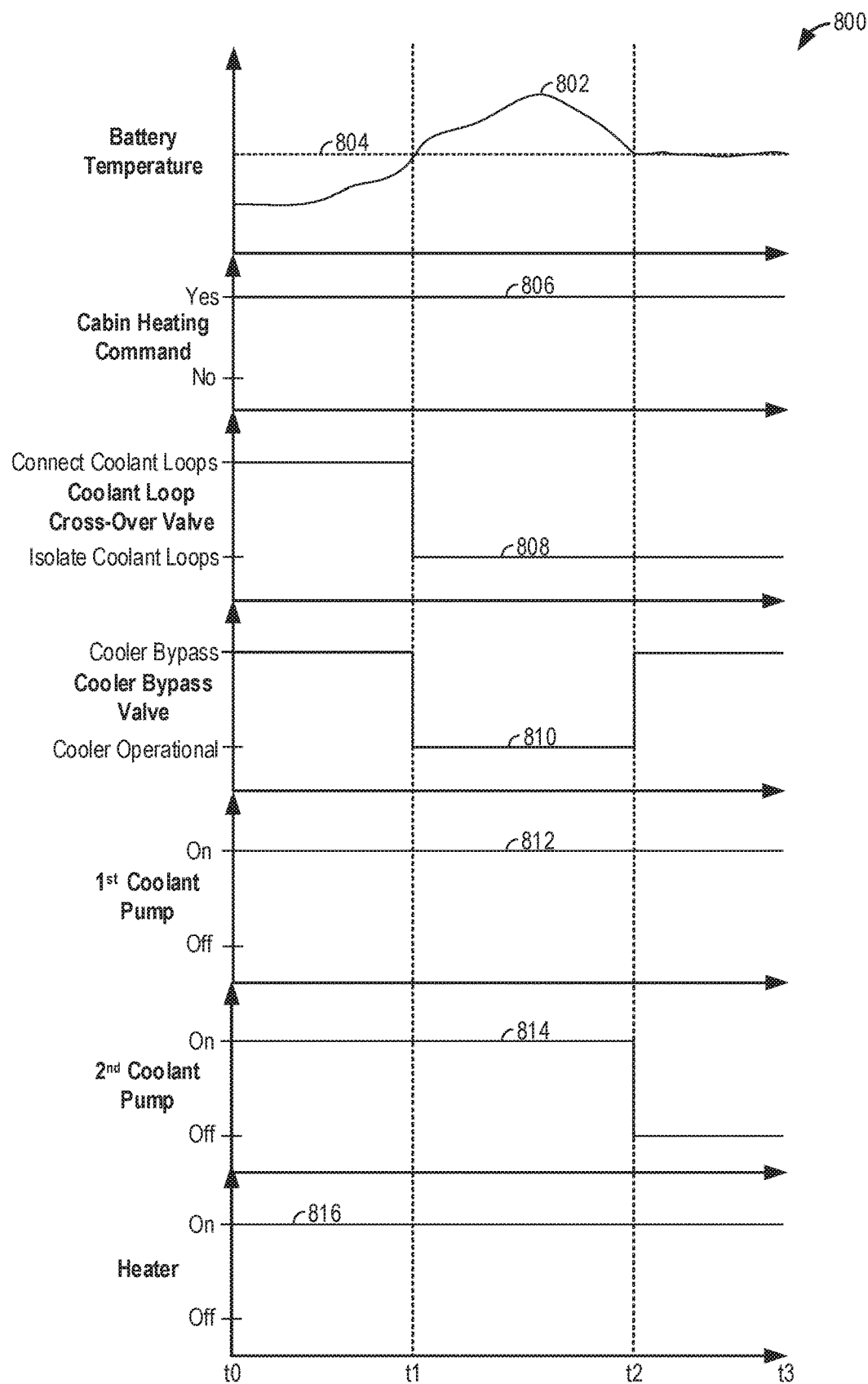
FIG. 8 shows a timing diagram with graphs, control signals, etc., embodying a use-case operational method for a thermal management system.

FIG. 1 shows a schematic depiction of a vehicle (e.g., battery electric vehicle (BEV)) with a thermal management system. FIGS. 2-5 show detailed illustrations of the thermal management system, of FIG. 1, in different operating modes. FIG. 6 shows a method for operation of a thermal management system. FIG. 7 shows a more detailed method for operation of a thermal management system. FIG. 8 shows a timing diagram corresponding to a thermal management system operating scheme use-case.

Referring to FIG. 1, the figure schematically depicts a vehicle 10 with a propulsion system 12. In this example, the propulsion system 12 includes an energy conversion device 14, which may include a motor, a generator, among others, and combinations thereof. Specifically, in one example, the energy conversion device 14 includes the motor. The energy conversion device 14 is coupled to a transmission 16. The transmission 16 may include torque converters, gears, and other mechanical devices to allow motive power to be transferred to drive wheel(s) 18 within a desired speed range or at a particular speed. Transmission 16 is shown coupled to drive wheel 18, which in turn is in contact with road surface 20.

The energy conversion device 14 is further shown coupled to an energy storage device 22, which may include a battery, a capacitor, a flywheel, a pressure vessel, etc. Specifically, in one example, the energy storage device 22 may be a traction battery. The energy conversion device can be operated to absorb energy from vehicle motion and/or the engine and convert the absorbed energy to an energy form suitable for storage by the energy storage device (i.e., provide a generator operation). The energy conversion device can also be operated to supply an output (power, work, torque, speed, etc.) to the drive wheels 18. It should be appreciated that the energy conversion device may, in some embodiments, include only a motor, only a generator, or both a motor and generator, among various other components used for providing the appropriate conversion of energy between the energy storage device and the vehicle drive wheels.

The depicted connections between energy conversion device 14, transmission 16, and drive wheel 18 indicate transmission of mechanical energy from one component to another, whereas the connections between the energy conversion device and the energy storage device may indicate transmission of a variety of energy forms such as electrical, mechanical, etc. For example, torque may be transmitted from the energy conversion device 14 to drive the vehicle drive wheels 18 via transmission 16. As described above energy storage device 22 may be configured to operate in a generator mode and/or a motor mode. In a generator mode, system 12 absorbs some or all of the output from the transmission 16, which reduces the amount of drive output delivered to the drive wheel 18, or the amount of braking torque to the drive wheel 18. Such operation may be employed, for example, to achieve efficiency gains through regenerative braking, improved engine efficiency, etc. Further, the output received by the energy conversion device may be used to charge energy storage device 22. In motor mode, the energy conversion device may supply mechanical output to drive wheel 18 through the transmission 16, for example, by using electrical energy stored in an electric battery. The energy storage device 22 may be selectively coupled to an external energy source, such as a power outlet, a charging station, portable battery, etc.

Figure 2:
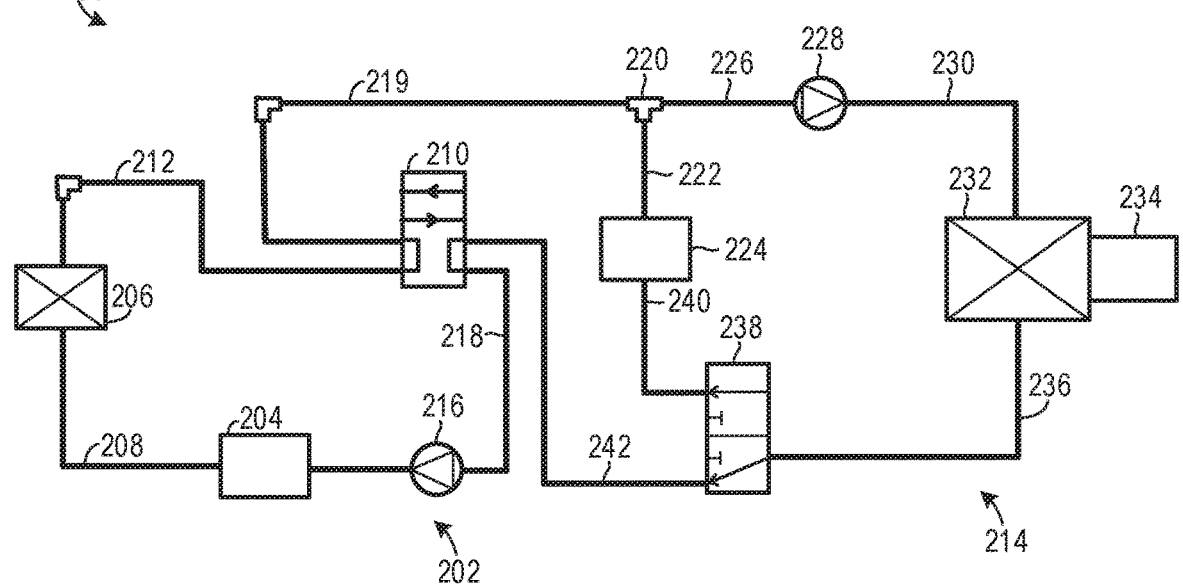
FIG. 2 illustrates a detailed example of the thermal management system, shown in FIG. 1.

The vehicle 10 also includes a thermal management system 26 designed to adjust the temperature of a vehicle cabin 28 and energy storage device 22. Further, in one example, the thermal management system 26 may also be designed to temperature adjust the energy conversion device 14. Arrows extending between the thermal management system 26 and the vehicle cabin 28 and the energy storage device 22 indicate the transfer of thermal energy from the system to the associated component or visa-versa. For instance, heated or cooled coolant, air, etc., may be transferred from the system to the energy storage device 22 and the vehicle cabin 28. The thermal management system 26 has greater complexity than is depicted in FIG. 1. A detailed illustration of an embodiment of the thermal management system is shown in FIG. 2 and described in greater detail herein.

Further in another example, the propulsion system 12 may be a hybrid propulsion system. In such an example, the vehicle 10 and propulsion system 12 include an internal combustion engine (not shown). Hybrid propulsion embodiments may include full hybrid systems, in which the vehicle can run on just the engine, just the energy conversion device (e.g., motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used.

From the above, it should be understood that the exemplary hybrid propulsion system is capable of various modes of operation. In a full hybrid implementation, for example, the propulsion system may operate using energy conversion device (e.g., an electric motor) as the only torque source propelling the vehicle. This "electric only" mode of operation may be employed during braking, low speeds, while stopped at traffic lights, etc. In another mode, engine (not shown) is turned on, and acts as the only torque source powering drive wheel. In still another mode, which may be referred to as an "assist" mode, an alternate torque source may supplement and act in cooperation with the torque provided by engine. As indicated above, energy conversion device may also operate in a generator mode, in which torque is absorbed from engine and/or transmission. Furthermore, the energy conversion device may act to augment or absorb torque during transitions of engine between different combustion modes (e.g., during transitions between a spark ignition mode and a compression ignition mode). Thus, the powertrain may be configured in various manners including as a parallel, a series, or a series-parallel hybrid vehicle.

FIG. 1 also shows a controller 100 in the vehicle 10. The controller 100 receives signals from the various sensors of FIG. 1 and employs the various actuators of FIG. 1 to adjust engine operation based on the received signals and instructions stored in non-transitory memory of the controller. The thermal management system components, shown in FIGS. 2-5, may also be controlled by the vehicle controller 100. Specifically, controller 100 is shown in FIG. 1 as a conventional microcomputer including: microprocessor unit 102, input/output ports 104, read-only memory 106, random access memory 108, keep alive memory 109, and a conventional data bus. Controller 100 is configured to receive various signals from sensors coupled to the propulsion system 12 and send command signals to actuators in components in the vehicle, such as the energy conversion device 14. Additionally, the controller 100 is also configured to receive pedal position (PP) from a pedal position sensor 110 coupled to a pedal 112 actuated by an operator 114. Therefore, in one example, the controller 100 may receive a pedal position signal and adjust actuators in the energy conversion device 14 based on the pedal position signal to vary the rotational output of the energy conversion device. It will be appreciated that other components receiving command signals from the controller may function in a similar manner. For instance, the valves 210 and 238 as well as the pumps 216 and 228, shown in FIG. 2, may include actuators and the actuators may alter fluid flow through the valves, pumps based on signals received from sensors in the vehicle 10. It will therefore, be appreciated that the actuators may be operated during the control methods described herein to carry out the actions of the steps.

The sensors may include an energy storage device temperature sensor 150, an energy conversion device temperature sensor 152, an energy conversion device rotational speed sensor 154, a cabin temperature sensor 156, an ambient temperature sensor 158, a cabin heating interface 160, etc.

It will be appreciated that the cabin heating interface 160 may be included in the thermal management system 26. The cabin heating interface 160 may be a dial, slide, graphical user interface (e.g., touch interface), peripheral device, etc., designed to generate a cabin heating command and send said command to the controller 100. The cabin heating command may be a desired cabin heat exchanger output, a cabin temperature set-point, etc. In some examples, the cabin heating command may be generated responsive to user interaction with the cabin heating interface 160. However, in other examples the cabin heating command may be automatically generated by the controller 100 based on predetermined cabin climate set-points, for instance.

FIG. 2 shows a schematic depiction of an exemplary embodiment 200 of the thermal management system 26, shown in FIG. 1. As such, the thermal management system 200 shown in FIG. 2, may be included in the vehicle 10, shown in FIG. 1.

The thermal management system 200 includes a first coolant loop 202. The working fluid in the coolant loops may include a solution of water and an organic chemical (e.g., ethylene glycol, diethylene glycol, or propylene glycol). However, other coolant solutions or types of coolant have been envisioned.

The first coolant loop 202 includes a heater 204. The heater 204 is designed to increase the heat of the coolant flowing therethrough. The heater 204 may be a positive temperature coefficient (PTC) heater, in one example. Using a PTC heater allows a desired amount of heat to be efficiency generated in a compact manner. The PTC heater may include, in one instance, semi-conductive ceramic element to facilitate the efficient heat generation. However, other types of heaters have been envisioned such as other types of electric heaters, gas type heaters, combinations thereof, etc.

The heater 204 is in fluidic communication with a cabin heat exchanger 206 (e.g., heater core) via a coolant line 208. As described herein, a coolant line is a conduit capable of flowing coolant between different components. As such, each coolant line may include an inlet, outlet, housing, internal flow passage, etc.

The cabin heat exchanger 206 is positioned in or adjacent to a vehicle cabin, such as the vehicle cabin 32, shown in FIG. 1. As such, the cabin heat exchanger 206 is designed to provide heated air to the vehicle cabin. For instance, a winding of coolant tubes with cabin air flowing there past may allow the heat exchanger to provide heated air to the cabin. However, numerous suitable heat exchanger arrangements may be used.

The cabin heat exchanger 206 is in fluidic communication with a valve 210 (e.g., two-way valve) via a coolant line 212. The valve 210 is configured to connect and disconnect the first coolant loop 202 from a second coolant loop 214. For instance, in a first position the valve 210 is designed to inhibit coolant flow between the first coolant loop 202 and the second coolant loop 214. However, in a second position the valve 210 is designed to flow coolant between the first coolant loop 202 and the second coolant loop 214 through a cross-over channel provided in the valve. Thus, in one example, the valve 210 may be a coolant cross-over valve. The valve 210 may include ports, seats, stems, flaps, chambers, and/or other suitable mechanisms to allow the valve to be placed in the first and second positions. Moreover, as previously discussed, the valve 210 and the other valves in the system 200 may include an actuator for accomplishing the control schemes described herein.

The valve 210 is in fluidic communication with a first coolant pump 216 designed to move coolant through the first coolant loop 202. A coolant line 218 extends between the valve 210 and the first coolant pump 216. The first coolant pump 216 and/or the other pumps described herein may have a continuously adjustable output allowing the flowrate of the coolant through the corresponding coolant loop to be precisely varied. However, in other examples, the first coolant pump 216 and/or the other coolant pumps described herein may be discretely adjustable. For instance, the first coolant pump may have an "on" and "off" configuration. As such, the output of the first coolant pump 216 and/or the other coolant pumps herein may be adjustable. The first coolant pump 216 may include a variety of suitable components such as pistons, pumping chambers, vanes, seals, electric motors, combinations thereof, etc., to accomplish the pumping functionality. As such, the first coolant pump 216 may be an electrically operated pump, in one example. It will be appreciated that the first coolant pump 216, the heater 204, the cabin heat exchanger 206, and other fluidic components in the system 200 include inlets and outlets coupled to upstream and downstream components, respectively.

The second coolant loop 214 includes a coolant line 219 providing fluidic communication between the valve 210 and a junction 220. The junction 220 is the confluence of a coolant line 222 coupled to an energy storage device cooler 224 and the coolant line 219. The energy storage device cooler 224 is designed to remove heat from coolant flowing there through and may include components such as coolant conduits, heat sinks (e.g., cooling fins), fans, and/or other suitable components for achieving the cooling functionality.

Additionally, a coolant line 226 extends between the junction 220 and a second coolant pump 228 designed to regulate the flow of coolant through the second coolant loop 214. The second coolant pump 228 may include similar components to the first coolant pump 216, in one example. However, in other examples, the second coolant pump 228 may include different mechanical components than the first coolant pump 216 and/or may be different in size from the first coolant pump.

A coolant line 230 extends between the second coolant pump 228 and an energy storage device heat exchanger 232. The energy storage device heat exchanger 232 is coupled to an energy storage device 234 (e.g., traction battery) and either transfers heat to or removes heat from the energy storage device. It will be appreciated that the energy storage device 234, shown in FIG. 2, is an example of the energy storage device 22, shown in FIG. 1. The energy storage device heat exchanger 232 may include plates, coolant tubes, housing, etc., coupled to the energy storage device 234 to achieve the heat transfer/removal functionality.

A coolant line 236 provides fluidic communication between the energy storage device heat exchanger 232 and a valve 238. The valve 238 may be configured to flow coolant into a coolant line 240 coupled to the energy storage device cooler 224 in a first configuration. In a second configuration the valve 238 may be configured to flow coolant into a coolant line 242 extending between the valve 238 and the valve 210. In the second configuration the valve 238 is configured to substantially inhibit coolant flow from the valve into the coolant line 240. On the other hand, in the first configuration the valve 238 is configured to substantially inhibit coolant flow from the valve into coolant line 242.

It will be appreciated that the controller 100 shown in FIG. 1 may be included in the thermal management system 200 of FIG. 2. As such, the controller 100 may implement various control strategies in the thermal management system 200, shown in FIG. 2.

Figure 3:
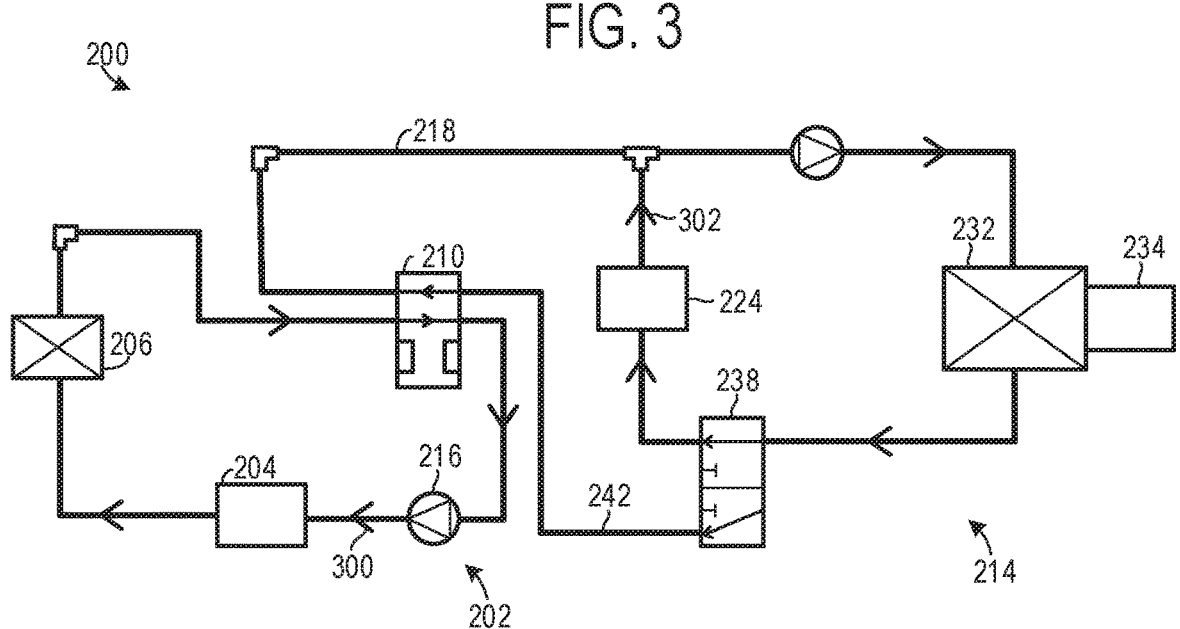
FIG. 3 illustrates a detailed example of the thermal management system, shown in FIG. 2, in a first configuration.
Figure 4:
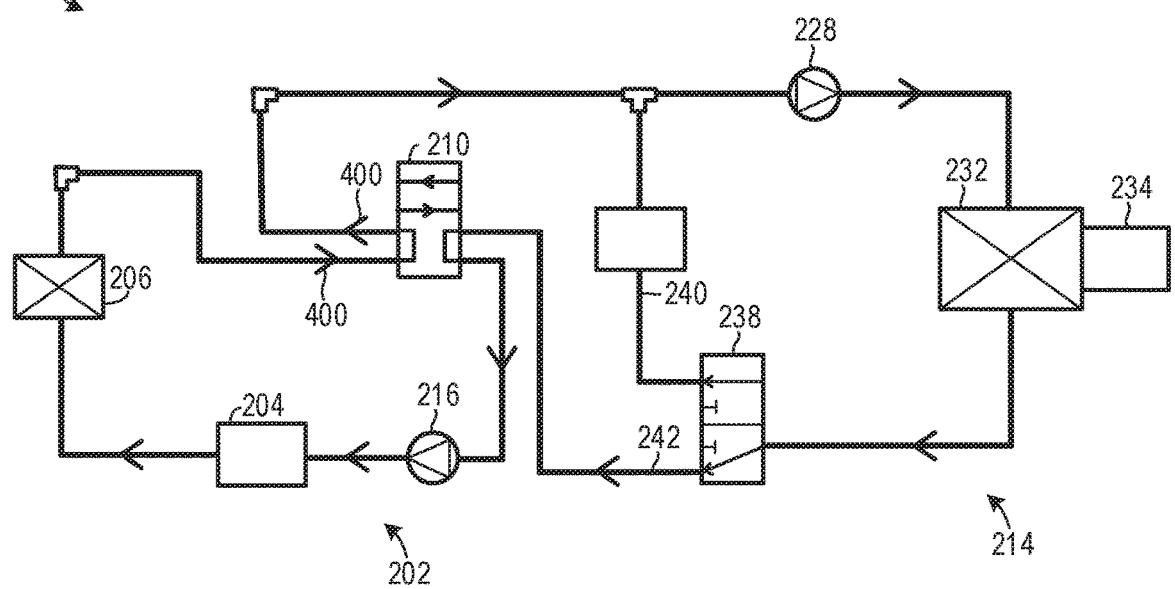
FIG. 4 shows the thermal management system, depicted in FIG. 2, in a second configuration.
Figure 5:
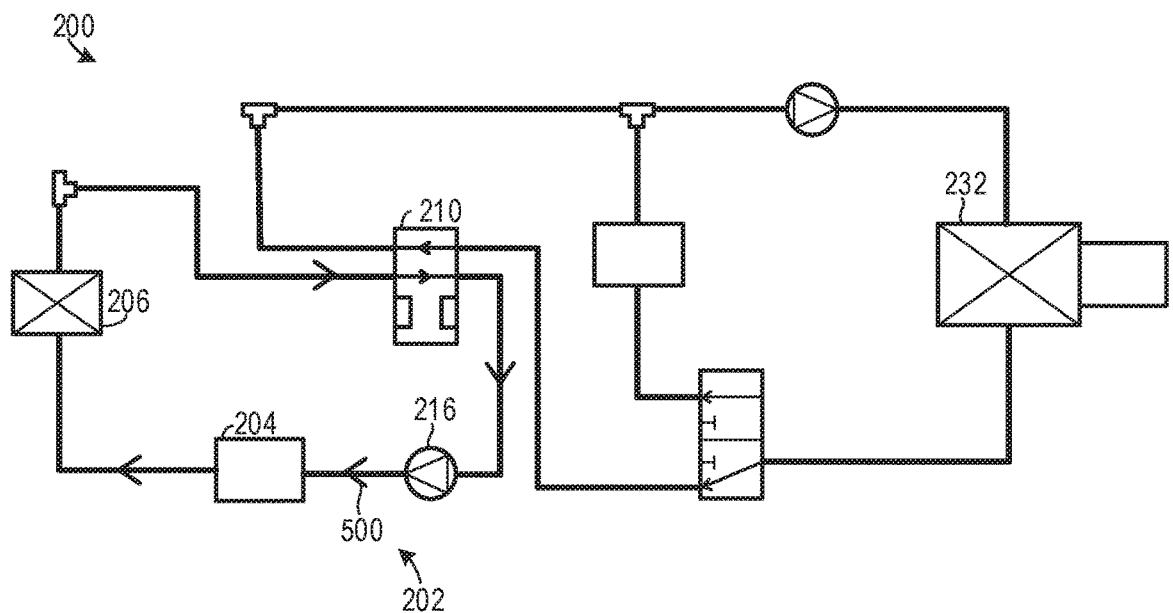
FIG. 5 illustrates the thermal management system, depicted in FIG. 2, in a third configuration.

FIGS. 3-5 show different operating modes of the thermal management system 200. Specifically, FIG. 3, shows the thermal management system 200 operating in a first mode. The entry conditions for the first mode may be a condition where the energy storage device 234 is above a threshold operating temperature or temperature range (e.g., 30° C., −10° C. to 30° C., 0° C. to 20° C., 5° C. to 25° C., etc.) and/or when a request for cabin heating is received by the controller.

In the first mode, heated coolant is flowed through the first coolant loop 202, indicated via arrows 300. Specifically, heated coolant is flowed from the heater 204 to the cabin heat exchanger 206. In this way, the first coolant loop 202 provides heat to the vehicle cabin. It will be appreciated that the first pump 216 and the valve 210 may be operated to place the system in the first mode of operation. For instance, the valve 210 may be placed in a configuration which inhibits coolant flow between the first coolant loop 202 and the second coolant loop 214 and allows coolant to circulate through the first loop.

Additionally, in the first mode, coolant which has passed through the energy storage device cooler 224 is flowed to the energy storage device heat exchanger 232 coupled to the energy storage device 234, indicated via arrows 302. In this way, coolant with a decreased temperature may be used to cool the energy storage device 234. It will be appreciated that in the first mode, coolant flowing through the first and second loops, 202 and 214, may be temporarily separated from one another. In this way, coolant may be flowed through the first and second coolant loops in parallel. It will be appreciated that coolant flow through the coolant lines 218 and 242 may be inhibited via valves 210 and 238, during the first mode.

FIG. 4 shows the thermal management system 200 operating in a second mode. In the second mode heated coolant is transferred from the heater 204 to the cabin heat exchanger 206 and then to the energy storage device heat exchanger 232 is series. Specifically, heated coolant is routed from the heater 204 to the cabin heat exchanger 206 then through valve 210 into the second coolant loop 214, indicated via arrows 400. The heated coolant is then routed through the pump 228 and the energy storage device heat exchanger 232. The coolant then flows from the heat exchanger 232 to the valve 238 and then through coolant line 242 back to valve 210 and then into the first coolant loop 202 upstream of the first coolant pump 216.

It will be appreciated that in the second mode the valve 210 allows cross-over coolant flow between the first coolant loop 202 and the second coolant loop 214. Additionally, the valve 238 directly coolant into coolant line 242 and prevents coolant flow into coolant line 240. Moreover, the heater 204 is activated to heat coolant flowing therethrough and the pumps 216 and 228 are activated to drive coolant flow through both coolant loops.

In this way, one heater may be used to provide heat to both the vehicle's cabin and energy storage device 234, thereby increasing system efficiency. It will be appreciated that in the illustrated example, heated coolant is routed from the cabin heat exchanger 206 to the energy storage device heat exchanger 232 without passing through any heat exchangers. As described herein a heat exchanger is a device used to transfer heat to a selected vehicle component and may include tubes, fins, conduits, etc., to achieve the heat transfer functionality. It will be appreciated that the coolant lines described herein are not heat exchangers. As such, heated coolant may be efficiently routed to the cabin and energy storage device. However other coolant circuit configurations may be used, in other examples.

FIG. 5 shows the thermal management system 200 operating in a third mode. In the third mode, heated coolant is routed through the first coolant loop 202 to the cabin heat exchanger 206, indicated via arrows 500. In particular, heated coolant travels from the heater 204, then the cabin heat exchanger 206, through the valve 210, and then to the first coolant pump 216. In the third mode, the second coolant loop 214 is inactive. That is to say, that neither heated nor chilled coolant is routed to the energy storage device heat exchanger 232. In this way, the cabin may be heated while energy storage device heating/cooling remains inactive. It will be appreciated that during the third mode the heater 204 is activated to heat coolant flowing there through, the valve 210 is configured to prevent cross-over coolant flow between the first coolant loop 202 and the second coolant loop 214, and the first coolant pump 216 is actively driving coolant flow in the first loop.

It will be appreciated that other modes of operation of the thermal management system have been envisioned. For instance, in a fourth mode, chilled coolant may be routed to the energy storage device while coolant flow in the first loop is substantially inactive. In this way, the energy storage device may be cooled while cabin heating is not occurring.

By operating the thermal management system 200 in the variety of modes, shown in FIGS. 3-5, the system can be adapted to meet heating and cooling needs of the cabin and energy storage device during a wide variety of operating conditions. As a result, the system's applicability may be increased. Furthermore, the system may be operated in the different modes via efficient coolant routing, to decrease losses in the system and therefore increase system efficiency.

FIG. 6 shows a method 600 for operation of a thermal management system. The method 600 and/or the other methods described herein, may be implemented via the thermal management systems and the vehicles described above with regard to FIGS. 1-5. However, in other examples, other suitable thermal management systems and vehicles may be used to implement method 600 and/or the other methods described herein. Instructions for carrying out method 600 and the rest of the methods included herein may be executed by a controller based on instructions stored on a memory of the controller and in conjunction with signals received from sensors of the engine system, such as the sensors described above with reference to FIGS. 1-6. The controller may employ engine actuators of the engine system to adjust engine operation, according to the methods described below.

At 602 the method includes determining operating conditions. The operating conditions may include energy storage device temperature, cabin heating command state, vehicle speed, energy conversion device speed, energy conversion device temperature, pedal position, ambient temperature, etc. The conditions may be determined based on inputs from vehicle sensors and/or inferred via modeling or other suitable predictive algorithms using for example, signals from other vehicle sensors. In other examples, empirically determined values correlated to other engine operating conditions may be stored in tables (e.g., look-up tables) to allow the abovementioned conditions to be ascertained.

At 604 the method includes determining a current operating mode for the thermal management system. Each mode may include a distinct set of entry conditions. In one example, the entry conditions for the first mode may be a condition where the energy storage device is above a threshold temperature and/or the cabin is below a threshold temperature, on one example. However, in other examples, one of the conditions may be when a cabin heating request is received by the controller. The entry conditions for the second mode may be, in one example, a condition where the energy storage device and/or the cabin are above threshold temperatures. The entry conditions for the third mode may be, in one example, a condition where the energy storage device is operating in a desired operating temperature range and a cabin heating request is received. However, other sets of modal entry conditions have been envisioned. Furthermore, it will be appreciated that the method may determine whether to enter the first, second, or third mode based on a determination of whether the first, second, or third set of entry conditions is present.

At 606 the method implements the first mode. In the first mode steps 608-610 are initiated. It will be appreciated that the steps 608-610 may be implemented at overlapping (e.g., concurrent) time intervals, in one example.

At 608 the method includes flowing heated coolant from the heater to the cabin heat exchanger. Flowing heated coolant from the heater to the cabin heat exchanger may include (i) operating the pump in the first coolant loop to generate or sustain coolant circulation in the first coolant loop and/or (ii) placing or sustaining the coolant loop cross-over valve in a configuration temporarily isolating the first and second coolant loops.

At 610 the method includes flowing cooled coolant from the energy storage device cooler to the energy storage device heat exchanger. Flowing cooled coolant from the energy storage device cooler to the energy storage device heat exchanger may include (i) placing or sustaining the cooler bypass valve in a configuration where the coolant is routed to the cooler and (ii) operating the pump in the second coolant loop to generate or sustain coolant circulation in the second coolant loop.

At 612 the method implements the second mode. In the second mode steps 614-616 are carried out. At 614 the method includes flowing heated coolant from the heater to the cabin heat exchanger. Flowing the heated coolant to the cabin heat exchanger from the heater may include operating the pump in the first coolant loop to generate or sustain coolant circulation in the first coolant loop.

At 616 the method includes flowing heated coolant from the cabin heat exchanger to the energy storage device heat exchanger, in series. Flowing heated coolant from the cabin heat exchanger to the energy storage device heat exchanger may include (i) placing or sustaining the coolant loop cross-over valve in a configuration fluidly coupling the first and second coolant loops in series and/or (ii) operating the pump in the second coolant loop to generate or sustain coolant circulation in the second coolant loop. It will be appreciated that steps 614 and 616 may be implemented in succession.

At 618 the method implements the third mode. Implementation of the third mode includes step 620. At 620 the method includes flowing heated coolant from the heater to the cabin heat exchanger. Flowing the heated coolant to the cabin heat exchanger from the heater may include operating the pump in the first coolant loop to generate or sustain coolant circulation in the first coolant loop. It will also be appreciated that in the third mode the coolant loop cross-over valve may be in a position which isolates the first and second coolant loops.

It will be appreciated that the system may transition between the different modes depending on the operating conditions in the system and/or vehicle. As such, transitions between the modes may occur responsive to a change in operating conditions. For example, the system may transition to the second mode from the first mode when the temperature of the energy storage device surpasses a threshold temperature or vice versa. Moreover, it will be appreciated that when one operating implemented the other modes are inhibited from being implemented.

FIG. 7 shows a detailed method for operating a thermal management system. At 702 the method includes determining operating conditions. The operating conditions may include one or more of the operating conditions indicated in step 602 and may be determined using one or more of the previously mentioned techniques.

At 704 the method includes determining if the energy storage device is below a threshold temperature or temperature range (e.g., $-10°$ C., $0°$ C., $-10°$ C. to $30°$ C., $0°$ C. to $30°$ C., $0°$ C. to $20°$ C., etc.) Determining if the energy storage device is below the threshold temperature may include receiving a signal from a temperature sensor, such as a temperature sensor coupled to the energy storage device, and determining if the temperature indicated by the signal is below a predetermined value. However, in other examples, the temperature of the energy storage device may be compared to a dynamic threshold generated by a battery operating model, for instance.

If it is determined that the energy storage device is not below the threshold temperature (NO at 704) the method advances to 706. At 706 the method includes determining if the energy storage device temperature is above a threshold value or range (e.g., $30°$ C., $20°$ C., $-10°$ C. to $30°$ C., $0°$ C. to $30°$ C., etc.) It will be appreciated that the determination at step 706 may use one or more of the techniques described above with regard to step 704 such as receiving sensor inputs, comparing the current temperature value to a predetermined threshold, etc.

If it is determined that the energy storage device temperature is above the threshold value or range (YES at 706) the method moves to 708. At 708 the method includes determining if a cabin heating request has been received. A cabin heating request may be generated by a cabin heating interface. The cabin heating interface may have selectable predetermined cabin heating outputs, climate control setpoints (e.g., selected cabin temperature), etc. As such, the cabin heating interface may include dials, a graphical user interface which may be controlled via touch input, voice commands, peripheral devices, etc., touch bars, etc. However, in other examples, the cabin heating request may be automatically generated.

If it is determined that the cabin heating request has been received (YES at 708) the method advances to 710 where the method includes implementing the first mode including steps 712-714. At 712 the method includes flowing heated coolant from the heater to the cabin heat exchanger and at 714 the method includes flowing cooled coolant from the energy storage device cooler to the energy storage device heat exchanger, similar to steps 608-610, shown in FIG. 6.

When it is determined that the cabin heating request has not been received (NO at 708). The method proceeds to 716 where a fourth operating mode is implemented. The fourth mode include step 718. At 718 the method includes flowing cooled coolant from the energy storage device cooler to the energy storage device. The fourth mode may also include inhibiting the flow of heated coolant to the cabin heat exchanger.

When it is determined that the energy storage device is not above the threshold temperature value or range (NO at 706) the method ends. Furthermore, when it is determined that the energy storage device temperature is below the threshold temperature or range (YES at 704) the method proceeds to 720.

At 720 the method includes determining if a cabin heating request has been received. If a cabin heating request has been received (YES at 720) the method moves to 722 where the method includes implementing a second operating mode. Steps 724-726 are initiated in the second mode. At 724 the method includes flowing heated coolant from the heater to the cabin heat exchanger and at 726 the method includes flowing heated coolant from the cabin heat exchanger to the energy storage device heat exchanger, in series, similar to steps 614-616, shown in FIG. 6.

On the other hand, if it is determined that a cabin heating request has not been received (NO at 720) the method moves to 728. At 728 the method includes implementing a third mode which includes step 730. At 730 the method includes flowing heated coolant from the heater to the cabin heat exchanger, similar to step 620, shown in FIG. 6.

Now turning to FIG. 8, depicting a use-case example of control method for the thermal management system. Temperature plots, valve control signals, pump control signals, etc., are illustrated in graphical format. Time is represented on the abscissa. The example of FIG. 8 is drawn substantially to scale, even though each and every point is not labeled with numerical values. As such, relative differences in timings can be estimated by the drawing dimensions. However, other relative timings may be used, if desired.

An energy storage device plot is indicated at 802. At 804 a desired battery temperature which may be used as a threshold value is illustrated. 806 indicates if a cabin heating command is being received. As shown, a cabin heating command is being received from t0 to t3.

A coolant loop cross-over valve command signal is indicated at 808. It will be appreciated that the coolant loop cross-over valve may be valve 210, shown in FIGS. 2-5. The coolant cross-over valve configurations, on the ordinate, signify a valve configuration where the first and second coolant loops are fluidly coupled in series or a valve configuration where the first and second coolant loops are fluidly isolated.

A cooler bypass valve command signal is indicated at 810. It will be appreciated that the cooler bypass valve may be valve 238, shown in FIGS. 2-5. The cooler bypass valve configurations, on the ordinate, signify a valve configuration where the valve directs coolant to the energy storage device cooler or a valve configuration where the valve directs coolant flow around the energy storage device cooler.

A command signal for the pump in the first coolant loop is indicated at 812. It will be appreciated that the pump may be the pump 216 shown in FIGS. 2-5. Pump configurations, on the ordinate, signify an "on" or "off" position. However, it will be appreciated that more nuanced pump control may be implemented, such controlling pump output in a continuously variable manner.

A command signal for the pump in the second coolant loop is expressed at 814. It will be appreciated that the pump may be the pump 228 shown in FIGS. 2-5. Pump configurations, on the ordinate, signify an "on" or "off" position. However, it will be appreciated that more nuanced pump control may be implemented such controlling in a continuously variable manner.

A heater command signal is indicated at 816. It will be appreciated that heater may be the heater 204, shown in FIGS. 2-5. Heater configurations, on the ordinate, signify an "on" or "off" condition. However, it will be appreciated that the heater may be configured for more granular control, in other examples.

As shown, from t0 to t1 the energy storage device temperature is below the threshold 804 and a cabin heating command is being received. Responsive to the occurrence of these conditions the coolant loop cross-over valve routes coolant in series between the two loops and the first and second pumps are turned on to drive coolant flow through each loop and between the two loops. Additionally, the cooler bypass valve routes coolant through the second coolant loop such that coolant bypasses the energy storage device cooler. Furthermore, the heater is activated from t0 to t1. It will be appreciated that the heater generates and transfers heat to the coolant passing there through when it is activated.

At t1, the energy storage device temperature surpasses the threshold 804 and the cabin heating command continues to be generated. Responsive to the occurrence of these conditions the coolant cross-over valve isolates the first and second coolant loops and the cooler bypass valve routes coolant in the second loop through the energy storage device cooler. The first and second pumps are also activated or activation of the pumps is sustained from t1 to t2. Additionally, the heater is activated from t1 to t2.

At t2 the energy storage device temperature reaches the threshold 804 and remains within a desired range around the threshold from t2 to t3 and the cabin heating command continues to be generated from t2 to t3. Responsive to the occurrence of these conditions the coolant cross-over valve isolates the first and second coolant loops and the second pump in the second coolant loop is deactivated. In this way, heat may be provided to the cabin heat exchanger while heating or cooling of the energy storage device is suspended. The heater is also activated from t2 to t3.

As illustrated by examples herein, the method of operating and performing actions responsive to a determination of a condition may include operating in that condition (e.g., operating the system in a selected mode), determining whether that condition is present (such as based on sensor output), and performing actions in response thereto, as well as operating without that condition present, determining that the condition is not present, and performing a different action in response thereto. Further, in one example, the modes of operation of the system may necessarily occur for example, in a drive cycle.

The thermal management systems and methods described herein allow for heating and cooling needs of the cabin and energy storage device to be efficiently achieved with robust and streamline cooling routing scheme.

The technical effect of providing a thermal management system in a vehicle designed to, during a first mode, route heated coolant through a first coolant loop with a heater and cabin heat exchanger and route cooled coolant through a second loop with an energy storage device cooler and a battery and, during a second mode, route heated coolant from a heater to a cabin heat exchanger and then to a battery is to increase the operating efficiency of the system and reduce system complexity while achieving desired heating and cooling needs of the vehicle cabin and the battery.

The invention will be further described in the following paragraphs. In one aspect, a thermal management system in a vehicle is provided that comprises a cabin heat exchanger in fluidic communication with a heater; an energy storage device heat exchanger in fluidic communication with the heater; and an energy storage device coupled to the energy storage device heat exchanger; and a controller with computer readable instructions stored in non-transitory memory that when executed, cause the controller to: in a first mode, flow heated coolant from the heater to the cabin heat exchanger in a first coolant loop and flow cooled coolant to the energy storage device heat exchanger from an energy storage device cooler in a second coolant loop temporarily separated from the first coolant loop; and in a second mode, flow heated coolant from the heater to the cabin heat exchanger and then to the energy storage device heat exchanger in series.

In another aspect, a method is provided that comprises: in a first mode, flowing heated coolant from a heater to a cabin heat exchanger in a first coolant loop and flowing cooled coolant to an energy storage device heat exchanger from an energy storage device cooler in a second coolant loop temporarily separated from the first coolant loop; and in a second mode, flowing heated coolant from the heater to the cabin heat exchanger and the energy storage device in series. In one example, the method may further include in a third mode, flowing heated coolant from the heater to the cabin heat exchanger and inhibiting coolant heating and cooling in the second coolant loop. Further in one example, the method may include transitioning into the third mode from the first mode or the second mode when an energy storage device temperature is within a desired operating range. In another example, the method may further include transitioning into the second mode from the first mode, when an energy storage device temperature is below a threshold value and when a cabin heating command is received. Still further in another example, the method may also include, in the second mode, inhibiting a flow of coolant through the energy storage device cooler.

In another aspect, a thermal management system in a battery electric vehicle (BEV), is provided that comprises: a cabin heat exchanger in fluidic communication with a heater; a traction battery heat exchanger in fluidic communication with the heater; a traction battery coupled to the traction battery heat exchanger; and a controller with computer readable instructions stored in non-transitory memory that when executed, cause the controller to: in a first mode, flow heated coolant from the heater to the cabin heat exchanger in a first coolant loop and flow cooled coolant to the traction battery heat exchanger from an energy storage device cooler in a second coolant loop temporarily separated from the first coolant loop; and in a second mode, flow heated coolant from the heater to the cabin heat exchanger and then to the traction battery heat exchanger in series; and in a third mode, flow heated coolant from the heater to the cabin heat exchanger and inhibit heating or cooling coolant in the second coolant loop.

In any of the aspects or combinations of the aspects, the vehicle may be a battery electric vehicle (BEV) and the energy storage device is a traction battery.

In any of the aspects or combinations of the aspects, the thermal management system may further comprise computer readable instructions stored in the non-transitory memory that when executed, cause the controller to: in a third mode, flow heated coolant from the heater to the cabin heat exchanger and inhibit heating or cooling of coolant in the second coolant loop.

In any of the aspects or combinations of the aspects, the thermal management system may further comprise computer readable instructions stored in the non-transitory memory that when executed, cause the controller to: transition into the third mode from the first mode or the second mode when an energy storage device temperature is within a desired operating range.

In any of the aspects or combinations of the aspects, the thermal management system may further comprise computer readable instructions stored in the non-transitory memory that when executed, cause the controller to: transition into the second mode from the first mode, when an energy storage device temperature is below a threshold value and when a cabin heating command is received.

In any of the aspects or combinations of the aspects, the first mode may be initiated when an energy storage device temperature is above a threshold value or temperature range and where the second mode is initiated when the energy storage device temperature is below the threshold value or temperature range.

In any of the aspects or combinations of the aspects, the thermal management system may further comprise computer readable instructions stored in the non-transitory memory that when executed, cause the controller to: inhibit a flow of coolant through the energy storage device cooler in the second mode.

In any of the aspects or combinations of the aspects, the heater may be the only heater in the thermal management system.

In any of the aspects or combinations of the aspects, the heater may be a positive temperature coefficient (PTC) heater.

In any of the aspects or combinations of the aspects, the thermal management system may further comprise computer readable instructions stored in the non-transitory memory that when executed, cause the controller to transition from the first mode to the second mode, where transitioning from the first mode to the second mode includes reconfiguring a valve coupled to the first coolant loop and the second coolant loop to allow flow between the first coolant loop and the second coolant loop.

In any of the aspects or combinations of the aspects, in the second mode, the heated coolant may be flowed from the cabin heat exchanger to the traction battery without traveling through other heat exchanger devices.

In another representation, a method comprises in a first mode, flowing heated coolant from a heater to a cabin heat exchanger separately from flowing cooled coolant to an energy storage device heat exchanger from an energy storage device cooler; and in a second mode, flowing heated coolant from the heater to the cabin heat exchanger and the energy storage device in series.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A thermal management system in a vehicle, comprising:
   a first coolant loop including a cabin heat exchanger and a heater that are in fluidic communication with each other;
   a second coolant loop including an energy storage device heat exchanger directly coupled to an energy storage device, where a working fluid in both of the first coolant loop and the second coolant loop is a coolant solution that comprises water; and
   a controller with computer readable instructions stored in non-transitory memory that, when executed, cause the controller to:
      in a first mode, flow a heated coolant solution from the heater to the cabin heat exchanger in the first coolant loop and flow a cooled coolant solution to the energy storage device heat exchanger from an energy storage device cooler in the second coolant loop that is temporarily fluidly separated from the first coolant loop; and
      in a second mode, flow a heated coolant solution from the heater to the cabin heat exchanger and then flow the heated coolant solution between the first and second coolant loops and to the energy storage device heat exchanger in series.

2. The thermal management system of claim 1, where the vehicle is a battery electric vehicle (BEV) and the energy storage device is a traction battery.

3. The thermal management system of claim 1, further comprising computer readable instructions stored in the non-transitory memory that, when executed, cause the controller to:
   in a third mode, flow a heated coolant solution from the heater to the cabin heat exchanger and inhibit heating or cooling of the coolant solution in the second coolant loop.

4. The thermal management system of claim 3, further comprising computer readable instructions stored in the non-transitory memory that, when executed, cause the controller to:
   transition into the third mode from the first mode or the second mode when an energy storage device temperature is within a desired operating range.

5. The thermal management system of claim 1, further comprising computer readable instructions stored in the non-transitory memory that, when executed, cause the controller to:
   transition into the second mode from the first mode, when an energy storage device temperature is below a threshold value and when a cabin heating command is received.

6. The thermal management system of claim 1, where the first mode is initiated when an energy storage device temperature is above a threshold value or a temperature range and where the second mode is initiated when the energy storage device temperature is below the threshold value or the temperature range.

7. The thermal management system of claim 1, further comprising computer readable instructions stored in the non-transitory memory that, when executed, cause the controller to:
   inhibit a flow of coolant through the energy storage device cooler in the second mode.

8. The thermal management system of claim 1, where the heater is the only heater in the thermal management system.

9. The thermal management system of claim 1, where the heater is a positive temperature coefficient (PTC) heater.

10. A method for operation of a thermal management system, comprising:
    in a first mode, flowing a heated coolant solution from a heater to a cabin heat exchanger in a first coolant loop and flowing a cooled coolant solution to an energy storage device heat exchanger from an energy storage device cooler in a second coolant loop that is temporarily fluidly separated from the first coolant loop, where the energy storage device heat exchanger is directly coupled to an energy storage device; and
    in a second mode, flowing the heated coolant solution from the heater to the cabin heat exchanger and then flowing the heated coolant solution between the first coolant loop and the second coolant loop and to the energy storage device in series.

11. The method of claim 10, further comprising, in a third mode, flowing a heated coolant solution from the heater to the cabin heat exchanger and inhibiting coolant solution heating and cooling in the second coolant loop.

12. The method of claim 11, further comprising transitioning into the third mode from the first mode or the second mode when an energy storage device temperature is within a desired operating range.

13. The method of claim 10, further comprising transitioning into the second mode from the first mode, when an energy storage device temperature is below a threshold value and when a cabin heating command is received.

14. The method of claim 10, further comprising, in the second mode, inhibiting a flow of the coolant solution through the energy storage device cooler.

15. The method of claim 10, where the first mode is initiated when an energy storage device temperature is above a threshold value or a temperature range and where the second mode is initiated when the energy storage device temperature is below the threshold value or the temperature range.

16. The method of claim 10, where the heater is the only heater in the thermal management system.

17. A thermal management system in a battery electric vehicle (BEV), comprising:
a first coolant loop comprising a cabin heat exchanger and a heater that are in fluidic communication with each other;
a second coolant loop comprising a traction battery heat exchanger directly coupled to a traction battery, where a working fluid in both of the first coolant loop and the second coolant loop is a coolant solution that comprises water; and
a controller with computer readable instructions stored in non-transitory memory that, when executed, cause the controller to:
in a first mode, flow a heated coolant solution from the heater to the cabin heat exchanger in a first coolant loop and flow a cooled coolant solution to the traction battery heat exchanger from an energy storage device cooler in a second coolant loop that is temporarily fluidly separated from the first coolant loop;
in a second mode, flow a heated coolant solution from the heater to the cabin heat exchanger and then flow the heated coolant solution between the first and second coolant loops and to the traction battery heat exchanger in series; and
in a third mode, flow a heated coolant solution from the heater to the cabin heat exchanger and inhibit heating or cooling of the coolant solution in the second coolant loop.

18. The thermal management system of claim 17, comprising transitioning from the first mode to the second mode, where transitioning from the first mode to the second mode includes reconfiguring a valve coupled to the first coolant loop and the second coolant loop to allow flow between the first coolant loop and the second coolant loop.

19. The thermal management system of claim 17, where in the second mode, the heated coolant solution is flowed in series from the cabin heat exchanger to the traction battery heat exchanger.

20. The thermal management system of claim 17, where the heater is the only heater in the thermal management system.

* * * * *